US 6,571,850 B2

(12) United States Patent
Melheim

(10) Patent No.: US 6,571,850 B2
(45) Date of Patent: Jun. 3, 2003

(54) FLOATING ANVIL USEABLE AGAINST A HEAT SEALING SHOE

(75) Inventor: Scott B. Melheim, St. James, MN (US)

(73) Assignee: V-Tek Incorporated, Mankato, MN (US)

(*) Notice: Subject to any disclaimer, the term of this patent is extended or adjusted under 35 U.S.C. 154(b) by 259 days.

(21) Appl. No.: 09/846,753

(22) Filed: May 1, 2001

(65) Prior Publication Data

US 2002/0162632 A1 Nov. 7, 2002

(51) Int. Cl.⁷ .............................................. B30B 15/00
(52) U.S. Cl. ................ 156/581; 156/583.1; 100/258 A; 53/374.8
(58) Field of Search ................................. 156/580, 581, 156/583.1; 100/258 R, 258 A; 53/374.8, 375.6

(56) References Cited

U.S. PATENT DOCUMENTS

| | | | |
|---|---|---|---|
| 2,589,756 A | * 3/1952 | Waters ........................ 154/42 |
| 3,937,645 A | 2/1976 | Ascoli et al. |
| 3,946,190 A | 3/1976 | Hascoe |
| 3,958,391 A | 5/1976 | Kujubu |
| 3,961,743 A | 6/1976 | Hollowell |
| 3,965,653 A | 6/1976 | Lerner |
| 3,969,874 A | 7/1976 | Halcomb et al. |
| 3,980,516 A | 9/1976 | Guard |
| 3,998,135 A | 12/1976 | Sargent |
| 4,001,066 A | 1/1977 | Channing et al. |
| 4,011,798 A | 3/1977 | Bambara et al. |
| 4,014,154 A | 3/1977 | Lerner |
| 4,017,946 A | 4/1977 | Soja |
| 4,019,946 A | 4/1977 | Greisman |
| 4,019,949 A | 4/1977 | Greisman |
| 4,025,383 A | 5/1977 | Ferrigno |
| 4,063,401 A | 12/1977 | Higgins |
| 4,064,776 A | 12/1977 | Walitalo et al. |
| 4,065,344 A | 12/1977 | Weist |
| T966,002 I4 | 1/1978 | Barnes et al. |
| 4,066,108 A | 1/1978 | Lau |
| 4,070,853 A | 1/1978 | Sanders |
| 4,071,999 A | 2/1978 | Nolet |
| 4,104,108 A | 8/1978 | Kishida et al. |
| 4,109,441 A | 8/1978 | Shaw |
| 4,160,689 A | 7/1979 | Altermatt |
| 4,202,721 A | 5/1980 | Roberts |
| 4,204,100 A | 5/1980 | Reichert |
| 4,221,101 A | 9/1980 | Woods |
| 4,221,626 A | 9/1980 | Clay |
| 4,244,159 A | 1/1981 | Gess |
| 4,260,447 A | 4/1981 | Muscariello |
| 4,261,582 A | 4/1981 | Womack |
| 4,282,699 A | 8/1981 | Embro, Jr. |
| 4,288,270 A | 9/1981 | Mossell et al. |
| 4,288,968 A | 9/1981 | Seko et al. |
| 4,294,492 A | 10/1981 | Evans |
| 4,300,892 A | 11/1981 | Barnes et al. |
| 4,306,400 A | 12/1981 | Coleman et al. |
| 4,311,476 A | 1/1982 | Williams |
| 4,331,434 A | 5/1982 | Buschor |
| 4,333,790 A | 6/1982 | Schaffron |
| 4,346,545 A | 8/1982 | Crescenzo et al. |
| 4,349,344 A | 9/1982 | Evers |

(List continued on next page.)

Primary Examiner—James Sells
(74) Attorney, Agent, or Firm—Oppenheimer Wolff & Donnelly LLP

(57) ABSTRACT

An anvil assembly having a housing and two rotatable inserts with flat upper surfaces against which the heated shoes of a package sealing machine may press a covering sheet onto a plastic package tape. The inserts have a limited range of rotation so that they automatically align themselves to be parallel to the heated shoes when they are contacted thereby. This rotatable insert feature obviates the need for precise, laborious alignment efforts.

33 Claims, 2 Drawing Sheets

U.S. PATENT DOCUMENTS

| | | |
|---|---|---|
| 4,351,692 A | 9/1982 | Ouellette |
| 4,378,266 A | 3/1983 | Gerken |
| 4,441,953 A | 4/1984 | Hollinger, Jr. |
| 4,488,924 A | 12/1984 | Krieg |
| 4,498,939 A | 2/1985 | Johnson |
| 4,504,350 A | 3/1985 | Joo |
| 4,504,352 A | 3/1985 | Meyer |
| 4,524,563 A | 6/1985 | Sassi |
| 4,534,154 A | 8/1985 | Gaubert |
| 4,545,177 A | 10/1985 | Day |
| 4,545,844 A | 10/1985 | Buchanan |
| 4,549,387 A | 10/1985 | Marshall et al. |
| 4,555,296 A | 11/1985 | Burtch et al. |
| 4,567,713 A | 2/1986 | Natterer |
| 4,613,320 A | 9/1986 | Lerner |
| 4,613,988 A | 9/1986 | Maddock |
| 4,637,199 A | 1/1987 | Steck et al. |
| 4,656,818 A | 4/1987 | Shimoyama et al. |
| 4,674,266 A | 6/1987 | Araki |
| 4,688,370 A | 8/1987 | Dighton et al. |
| 4,689,937 A | 9/1987 | Finan, Sr. et al. |
| 4,699,608 A | 10/1987 | Pistner |
| 4,704,100 A | 11/1987 | Kaufman |
| 4,720,872 A | 1/1988 | Kaczerwaski |
| 4,721,502 A | 1/1988 | Herrington |
| 4,733,517 A | 3/1988 | Araki |
| 4,768,411 A | 9/1988 | Su |
| 4,776,150 A | 10/1988 | Siegel |
| 4,820,249 A | 4/1989 | Wech |
| 4,832,773 A | 5/1989 | Shaposka et al. |
| 4,832,776 A | 5/1989 | Pace |
| 4,840,610 A | 6/1989 | Pistner |
| 4,849,040 A | 7/1989 | Wood |
| 4,874,257 A | 10/1989 | Inagaki |
| 4,894,040 A | 1/1990 | Bach et al. |
| 4,894,975 A | 1/1990 | Ausnit |
| 4,919,272 A | 4/1990 | Kai et al. |
| 4,941,310 A | 7/1990 | Kristen |
| 4,960,478 A | 10/1990 | Newkirk et al. |
| 4,965,985 A | 10/1990 | Masubuchi et al. |
| RE33,467 E | 12/1990 | Steck et al. |
| 4,989,391 A | 2/1991 | Wetter |
| 4,999,504 A | 3/1991 | Braunlich et al. |
| 5,021,209 A | 6/1991 | Dickinson |
| 5,022,767 A | 6/1991 | Cardulla |
| 5,029,432 A | 7/1991 | Loeliger |
| 5,030,190 A | 7/1991 | Woods et al. |
| 5,038,547 A | 8/1991 | Kai et al. |
| 5,080,747 A | 1/1992 | Veix |
| 5,087,235 A | 2/1992 | Lafleur |
| 5,110,041 A | 5/1992 | Keeler |
| 5,118,202 A | 6/1992 | Bruno |
| 5,134,001 A | 7/1992 | Osgood |
| 5,141,795 A | 8/1992 | Kai et al. |
| 5,152,613 A | 10/1992 | Herrington, Jr. |
| 5,155,969 A | 10/1992 | Kuethe |
| 5,167,750 A | 12/1992 | Myers |
| 5,188,623 A | 2/1993 | Kok |
| 5,230,430 A | 7/1993 | Kidder |
| 5,252,171 A | 10/1993 | Anderson et al. |
| 5,286,110 A | 2/1994 | Benson et al. |
| 5,304,265 A | 4/1994 | Keeler |
| 5,322,719 A | 6/1994 | Westling et al. |
| 5,350,000 A | 9/1994 | Wang |
| 5,375,930 A | 12/1994 | Tani |
| 5,410,857 A | 5/1995 | Utley |
| 5,417,041 A | 5/1995 | Hansen et al. |
| 5,456,055 A | 10/1995 | Boulanger et al. |
| 5,465,842 A | 11/1995 | Utley |
| 5,472,282 A | 12/1995 | Kristola |
| 5,483,784 A | 1/1996 | Owensby et al. |
| 5,489,252 A | 2/1996 | May |
| 5,509,735 A | 4/1996 | May |
| 5,518,316 A | 5/1996 | Kristola |
| 5,520,464 A | 5/1996 | Kristola |
| 5,524,633 A | 6/1996 | Heaven et al. |
| 5,533,323 A | 7/1996 | Osti et al. |
| 5,540,802 A | 7/1996 | Totani |
| 5,564,263 A | 10/1996 | Boulanger et al. |
| 5,564,478 A | 10/1996 | Weinheimer et al. |
| 5,564,829 A | 10/1996 | Lafond |
| 5,567,980 A | 10/1996 | Holonyak, Jr. et al. |
| 5,576,037 A | 11/1996 | Moore, Jr. et al. |
| 5,593,397 A | 1/1997 | La Gro |
| 5,599,421 A | 2/1997 | Frost et al. |
| 5,604,000 A | 2/1997 | May |
| 5,613,344 A | 3/1997 | Osti et al. |
| 5,613,601 A | 3/1997 | Boulanger et al. |
| 5,618,252 A | 4/1997 | Melville |
| 5,636,925 A | 6/1997 | Smiley |
| 5,662,575 A | 9/1997 | Saito et al. |
| 5,682,727 A | 11/1997 | Harte et al. |
| 5,702,339 A | 12/1997 | Smiley |
| 5,733,636 A | 3/1998 | May |
| 5,761,878 A | 6/1998 | Walkiewicz, Jr. et al. |
| 5,771,667 A | 6/1998 | McGregor et al. |
| 5,786,010 A | 7/1998 | Yannuzzi, Jr. |
| 5,791,125 A | 8/1998 | Kallner |
| 5,814,382 A | 9/1998 | Yannuzzi, Jr. |
| 5,816,990 A | 10/1998 | Melville |
| 5,858,164 A | 1/1999 | Panjwani et al. |
| 5,863,378 A | 1/1999 | Panjwani et al. |
| 5,865,942 A | 2/1999 | Sinclair |
| 5,868,901 A * | 2/1999 | Smith .................. 156/582 |
| 5,893,256 A | 4/1999 | Ghirlandi |
| 5,918,441 A | 7/1999 | Baker |
| 5,952,025 A | 9/1999 | Yannuzzi, Jr. |
| 6,021,629 A | 2/2000 | Sterner, Sr. |
| 6,038,839 A | 3/2000 | Linkiewicz |
| 6,058,681 A | 5/2000 | Recchia, Jr. |
| 6,058,735 A | 5/2000 | Nathan |
| 6,065,271 A | 5/2000 | Nicastro |
| 6,230,781 B1 * | 5/2001 | Smith .................. 156/582 |

\* cited by examiner

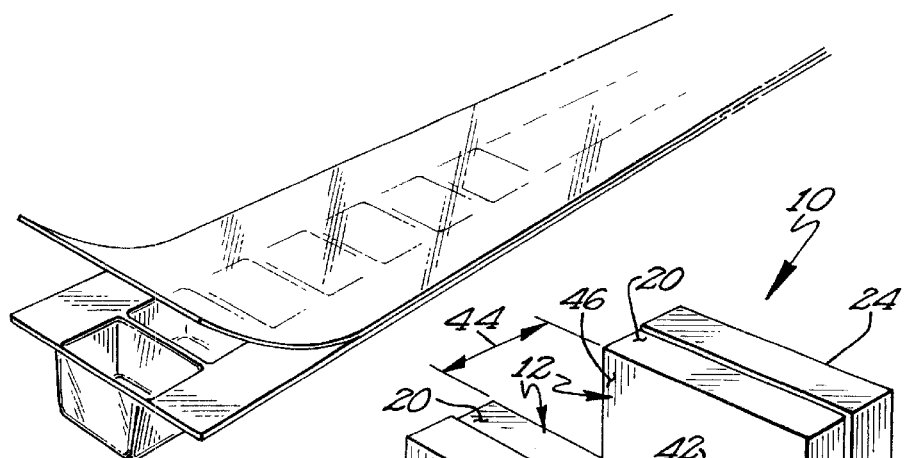
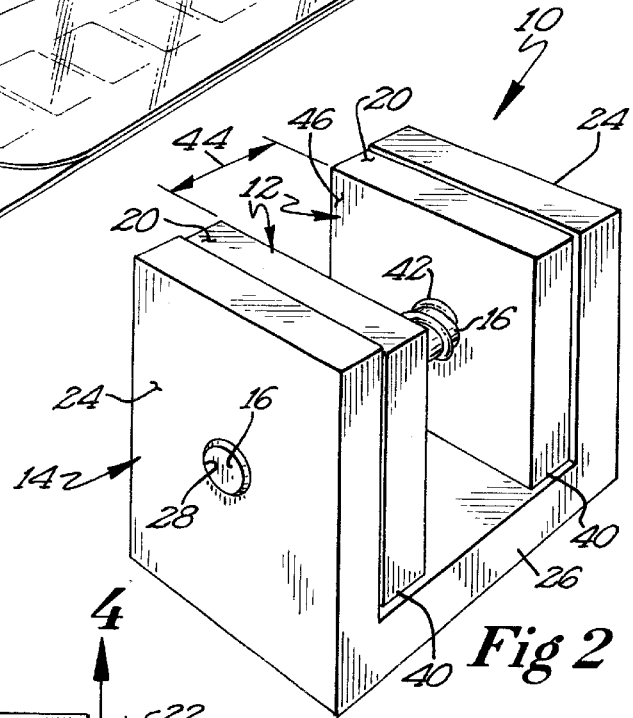
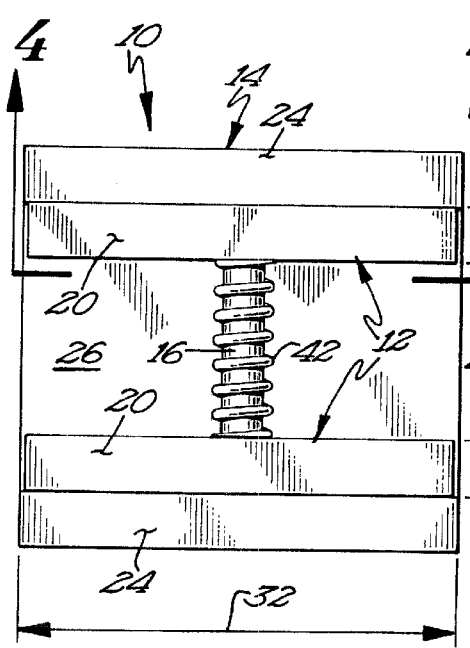
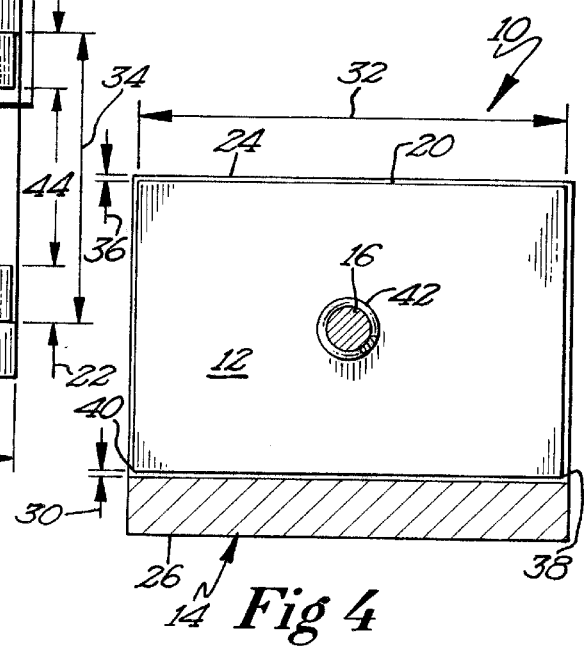
Fig 1
Fig 2
Fig 3
Fig 4

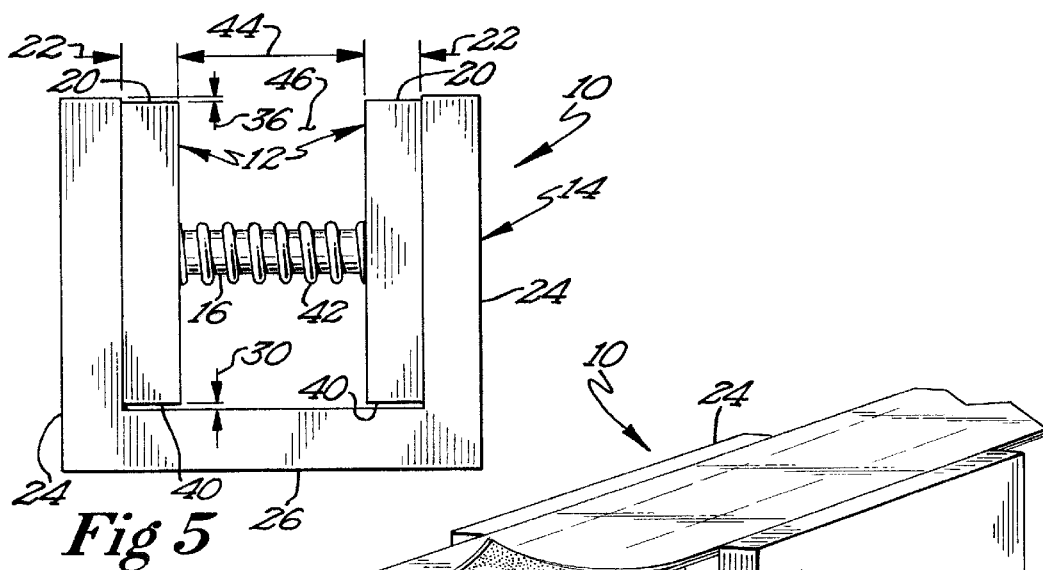
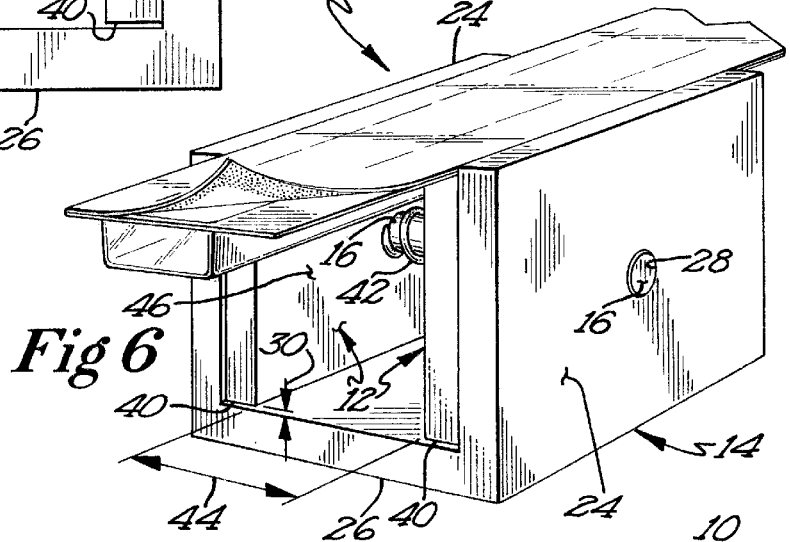
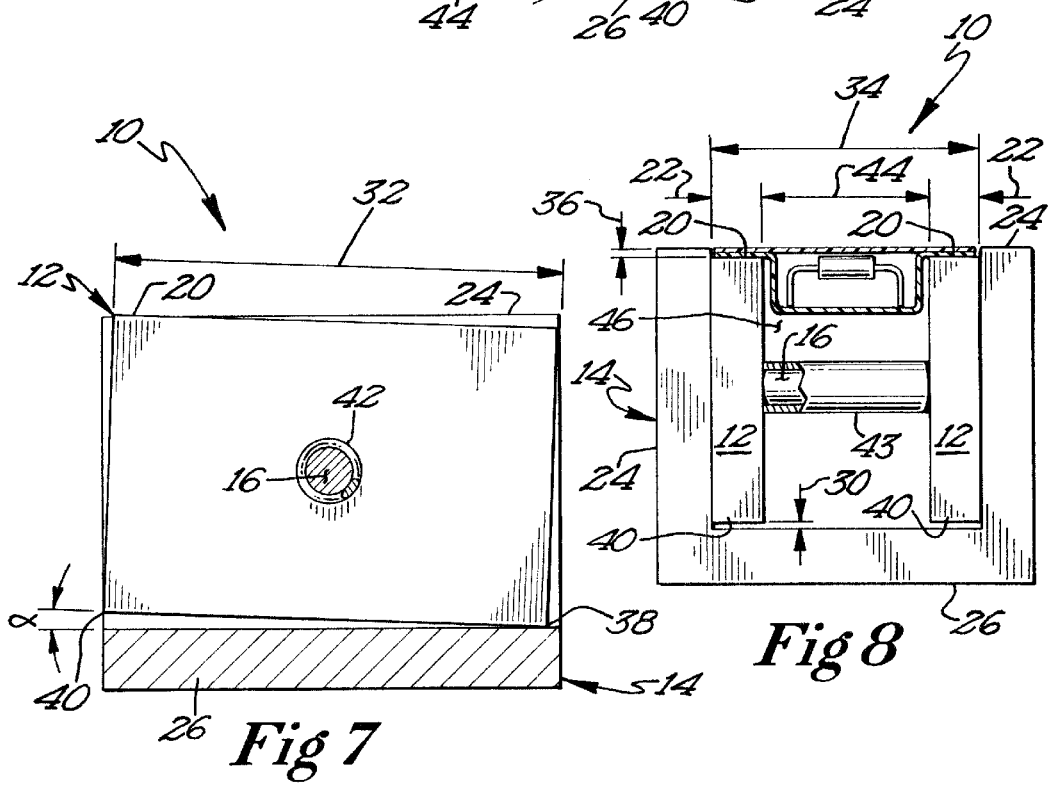
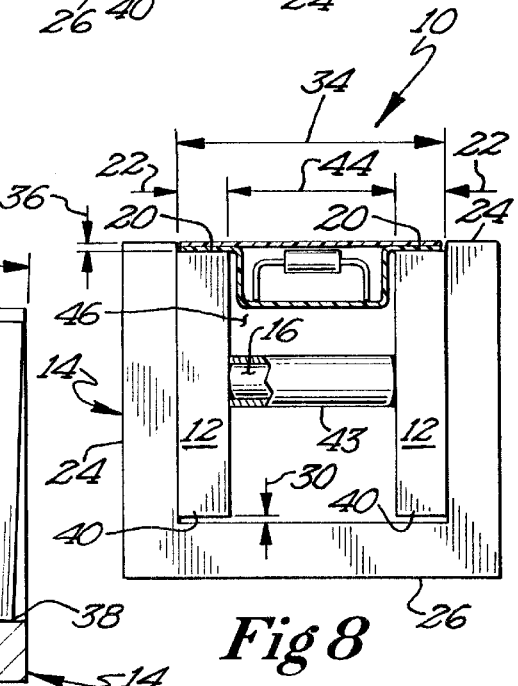

FLOATING ANVIL USEABLE AGAINST A HEAT SEALING SHOE

BACKGROUND OF THE INVENTION

The field of the present invention pertains generally to packaging for electronic components. More specifically, the present invention pertains to a device used to seal plastic containers for electronic components which includes an anvil.

Automating the process of making electronic circuitry necessarily includes presenting electronic components to a robot in a consistent, predictable orientation so that the robot may grasp the component and place it onto a circuit board. Requiring a robot to select and orient the components from a bin, for example, would be impractical, if not impossible. Even if the components are placed on the circuit board manually, presenting the components in a consistent, orderly fashion increases the productivity of the worker.

Proper packaging methods can ensure that the components are presented to an operator, assembler, or a robot in a predictable, repeatable manner. One such packaging method results in a string or "tape" of plastic pockets, each containing a component. This method includes a forming a strip of plastic into an elongate tape of pockets which are roughly centered between the longitudinal edges of the tape. The pockets do not extend all the way to the edges of the tape such that two horizontal flanges exist on either side of the pockets. The flanges run the length of the tape and provide a surface to which a cover sheet may be attached to secure the components within the pockets. An example of this type of packaging is shown in FIG. 1.

One manufacturing problem that this packaging presents pertains to the accuracy required by the machinery used to secure the covering sheet to the flanges. Whether the covering sheet is secured to the flanges with an adhesive or by heat sealing, a rigid surface below the flange and above the sheet are used to press the sheet and the flange against each other. Because the flange and the cover are extremely thin, there is little room for error in the alignment of the opposing rigid surfaces. If, for example, the surfaces are not completely parallel, one side of the rigid surface will be closer to its opposing counterpart than the other side. As the two rigid surfaces approach each other in a sealing operation, the closer side will make contact first, thereby pressing the cover and the flange together, but will prevent the other side from ever making contact and, thus, forming a proper seal. The result will be a length of the belt wherein one side of the cover is secured and the other is not. If allowed to repeat, there will be produced a component belt having areas in which the cover is secured alternating with areas in which the cover is not secure.

There is a need for a anvil having flat surfaces which automatically assume an orientation which is parallel to the flat surface against which they are being pressed.

There is further a need for an improved anvil that obviates the need for periodic realignment.

BRIEF SUMMARY OF THE INVENTION

A "floating" anvil assembly is provided having a pair of inserts with two flat contact surfaces against which a heated shoe may be pressed. The inserts have a predetermined range of rotation about an axis such that when the shoe is pressed against each of the inserts, the contact surfaces of the inserts assume a parallel relationship with the contact surfaces of the shoes.

More specifically, the anvil assembly of the present invention generally comprises a base to which a pin is operably connected. A first and second insert are rotatable around the pin over a predetermined angular range. The base is preferably shaped like a horseshoe, opening upwardly, with the inserts positioned on the insides of, and adjacent to, the base side walls.

The flat contact surfaces of the inserts are constructed and arranged to act against a separate surface of the package sealing machine during a sealing operation. The upper surfaces preferably end slightly below the walls of the base so that the upper inside sides of the base walls may act against the sides of the packaging tape to maintain the alignment of the tape as it is fed over the inserts. The predetermined range of rotation is provided by the shape of the lower edges of the inserts. The lower edges of the inserts act against the bottom of the base during rotation, thereby defining the forward and rearward limits of rotation.

In operation, the anvil assembly is placed in a heat sealing machine and a packaging tape is fed over the inserts so that the flanges of the tape ride on the top surfaces of the inserts and the pockets of the tape extend between the inserts. A heated shoe having heated surfaces drops down and acts against the top surfaces of the inserts to press the cover sheet and the flanges of the tape together. The inserts may rotate slightly so that the top surfaces of the inserts are parallel to the heated surfaces of the shoe. The shoe remains pressed against the inserts for a predetermined period of time until enough heat is absorbed by the packaging to create a seal between the flange of the package and the covering sheet. The shoe is then lifted and the tape is advanced, guided by the walls of the base, and the process repeats.

The ability of the inserts to rotate slightly ensures that the pressure felt by the packaging will be substantially even across the extents of the upper surfaces of the inserts. If the inserts were fixed relative to the base, the inserts would have to be perfectly parallel to the surfaces of the packaging machine in order to accomplish placing even pressure across the extents of the inserts.

It is therefore an object of the present invention to provide an anvil assembly having contact surfaces which rotate to assume a parallel relationship with the heated surfaces of a shoe acting the anvil assembly.

It is further an object to provide an anvil assembly which obviates the need for realigning a packaging machine on a regular basis.

These and further objects and advantages of the present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where:

FIG. 1 is a perspective view of a component tape and covering sheet to which the present invention is directed;

FIG. 2 is a perspective view of a preferred anvil assembly of the present invention;

FIG. 3 is a plan view of a preferred anvil assembly of the present invention;

FIG. 4 is a cutaway side elevation of preferred anvil assembly of the present invention taken generally along lines 4—4 of FIG. 3;

FIG. 5 is a front elevation of the preferred anvil assembly of the present invention;

FIG. 6 is a perspective view of the anvil assembly of the present invention receiving a packaging tape;

FIG. 7 is a cutaway side elevation of preferred anvil assembly of the present invention showing the range of motion of the inserts around the pin; and, FIG. 8 is a front elevation of the preferred anvil assembly of the present invention carrying a packaging tape which is cutaway to show how the tape is received by the anvil assembly.

All Figures are drawn for ease of explanation of the basic teachings of the preferred embodiments only. The extensions of the Figures with respect to number, position, relationship, and dimensions of the parts to form the preferred embodiments will be explained or will be within the skill of the art after the following description has been read and understood. Further, the exact dimensional proportions to conform to the specific force, weight, strength, and similar requirements will likewise be within the skill of the art after the following description has been read and understood.

DETAILED DESCRIPTION OF THE INVENTION

Referring now to the Figures, there is shown an anvil assembly 10 useable with a packaging machine for pressing a covering sheet onto a package. The anvil assembly 10 is attachable to the packaging machine and provides a pair of flat surfaces against which heated shoes may press a cover sheet and a packaging tape together. The anvil assembly 10 generally has inserts 12, a base 14, and a pin 16. The pin 16 is supported by the base 14 and the inserts 12 have a limited range of rotation around the pin 16.

The inserts 12 have top surfaces 20 which are straight, flat and have widths 22. Widths 22 define the maximum width of the seals that may be made between the covering sheet and the flanges of the packaging tape. It is envisioned that the inserts 12 of the anvil assembly 10 are removable and interchangeable with inserts 12 of various sizes such that a given anvil assembly 10 may be used in sealing operations involving packaging tapes of various sizes. Though the shape of the inserts is shown as being rectangular in the Figures, it is envisioned that a plurality of shapes could be used so long as the top surfaces 20 are straight and flat as shown in the Figures. Rectangular inserts 12, however, are simple and efficient to manufacture.

It is also envisioned that the two inserts 12 used during a given sealing operation may be of different widths 22 to match packaging tapes having flanges of different widths. For example, a packaging tape may have part of one flange perforated for use as a feed belt. Though the cover may not extend over this part, the insert 12 on the side of the flange defining the feed belt will be wide enough to support the wider flange.

The base 14 is sturdy and attachable to the heat sealing machine. Preferably, the base 14 has two walls 24 that extend upwardly from a floor 26. The walls 24 define two holes 28 through which the pin 16 may be inserted. The Figures show these holes 28 located relatively in the center of the walls 24. The pin 16 functions to support the inserts 12 and to define and axis of rotation around which the inserts 12 rotate. In order to provide balance to the inserts 12, it is important that the pins are located midway between the forward edge 40 and rearward edge 38 of the inserts 12. This ensures even pressure will be felt by the entire top surfaces 20 of the inserts 12. However, the vertical placement of the pin 16 may vary.

The walls 24 of the base 14 are separated by a distance 34 which is approximately equal to, or slightly greater than, the width of the packaging tape that will pass through a channel 46 defined by the walls 24 and the pin 16 during a sealing operation. The walls 24 act as a guide against the sides of the tape to maintain the tape in proper alignment with the anvil assembly 10 and the packaging machine. To this end, it is preferable that the inserts 12 do not extend to the top surface of the walls 24. Rather, the inserts 12 are constructed and arranged so that their top surfaces 20 are located below the tops of the walls 24 by a distance 36 which is equal to or slightly greater than the thickness of the tape flange and covering material.

Similarly, the bottom edges of the inserts 12 do not extend to the floor 26 of the base 13 when the bottom edges of the inserts 12 are parallel to the floor 26. As shown in FIG. 7, in order to provide the desired range of rotation a of the inserts 12, the inserts 12 are elevated above the floor 26 by a predetermined elevation 30. Elevation 30 is calculated, based on the length 32 of the inserts 12, to provide a range of rotation α which is less than 180°, preferably between +/−0.5° to +/−2.5°, more preferably on the order of +/−1.0° The length 32 affects the forward and rearward rotation limits of the inserts 12 in that the rearward bottom edge 38 abuts against the floor 26 when the inserts 12 have reached their rearward rotation limits, and the forward edge 40 abuts against the floor 26 when the inserts 12 have reached their forward rotation limits. Therefore, the length 32 of the inserts 12, as well as the elevation 30 above the floor 26, determine the range of rotation α.

A relatively small range of rotation a, such as +/−1.0°, is adequate to accomplish the objects of the invention because the degree of error in the setup of an anvil assembly in a packaging machine does not exceed this range. Providing an excessively large range of rotation α could be disadvantageous as the excessive angular movement of the inserts 12 during a sealing operation may impart a horizontal force on the packaging tape, thereby causing it to "walk" in a forward or rearward direction.

It is envisioned that the base 14 be of any suitable shape which accomplishes the functions described herein. However, like the inserts 12, the relatively rectangular design of the base 14 which is shown in the Figures, is advantageous for purposes of accurate and efficient manufacturing, and ease of attachment to the packaging machine.

In order to form a proper seal between the covering film and the flanges of the packaging tape, it is important that the inserts 12 remain separated and close to or abutting the inside surfaces of the walls 24. This is best accomplished by providing a spring 42 which winds around the pin 16 and is biased to push the inserts 12 apart. Maintaining the inserts 12 in this spaced apart relationship also ensures that an appropriate gap 44 exists between the inserts 12 to allow room for the pockets of the packaging tape to pass. A preferred embodiment, shown in FIG. 8, provides a tubular spacer 43, surrounding pin 16, cut to a predetermined length in order to maintain proper spacing between the inserts 12 while allowing the inserts 12 to rotate freely through the range of rotation α, adjacent the walls 24. Alternatively, washers or similar rigid stops could be attached to, or formed on, the pin 16 in order to keep the inserts 12 from drifting along the pin 16 toward each other.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention.

Accordingly, the present invention is not limited in the particular embodiments which have been described in detail therein. Rather, reference should be made to the appended claims as indicative of the scope and content of the present invention.

What is claimed is:

1. An anvil assembly, useable against a shoe of a machine which seals a cover to flanges of a package, the flanges and the cover having predetermined thicknesses, the anvil assembly comprising:
   a base;
   a pin operably connected to said base;
   a first insert rotatable about said pin over a predetermined range of rotation and having a surface constructed and arranged to act the shoe during a sealing operation; and,
   a second insert opposite said first insert and rotatable about said pin over a predetermined range of rotation and having a surface constructed and arranged to act against a shoe of the sealing machine during a sealing operation.

2. The anvil assembly of claim 1 wherein said base comprises a wall defining a hole sized to receive said pin.

3. The anvil assembly of claim 1 wherein said base comprises a pair of opposed walls, each defining a hole receiving opposite ends of said pin.

4. The anvil assembly of claim 3 wherein said base further comprises a floor connecting said opposed walls.

5. The anvil assembly of claim 4 wherein said inserts are positioned a predetermined distance from said floor such that when said inserts are rotated, said inserts abut against said floor, said floor thereby defining the limits of said range of rotation.

6. The anvil assembly of claim 1 wherein said predetermined range of rotation is between +/−0.5 degrees to +/−2.5 degrees.

7. The anvil assembly of claim 6 wherein said predetermined range of rotation is on the order of +/−1.0 degrees.

8. The anvil assembly of claim 3 wherein said walls extend above said first and second insert surfaces by a predetermined amount.

9. The anvil assembly of claim 8 wherein said predetermined amount that said walls extend above said first and second insert surfaces is greater than the predetermined thicknesses of the cover and the package combined, measured when said inserts are parallel to said walls.

10. The anvil assembly of claim 1 wherein said first and second inserts are separated and define a channel therebetween through which a packaging tape may pass while a plastic covering film is attached thereto.

11. The anvil assembly of claim 3 further comprising a spring surrounding said pin and sized to press said inserts against said base walls.

12. The anvil assembly of claim 3 further comprising a spacer of a predetermined length surrounding said pin and sized to maintain said inserts in a spaced apart relationship.

13. An anvil assembly, useable in a package sealing machine, comprising:
    a pair of opposed inserts having flat upper surfaces of predetermined widths; and,
    a base constructed and arranged to rotatably hold said inserts such that said flat upper surfaces are presented toward sealing shoes of the package sealing machine during operation.

14. The anvil assembly of claim 13 wherein said base comprises at least one pin rotatably holding said inserts.

15. The anvil assembly of claim 14 wherein said base further comprises a wall defining a hole sized to receive said at least one pin.

16. The anvil assembly of claim 14 wherein said base further comprises a pair of opposed walls, each defining a hole sized to receive said at least one pin.

17. The anvil assembly of claim 16 wherein said holes defined by said pair of opposed walls are in opposing alignment with each other.

18. The anvil assembly of claim 16 wherein said base further comprises a floor connecting said opposed walls.

19. The anvil assembly of claim 13 wherein said inserts are rotatably held by said base such that the inserts have a predetermined range of rotation which is less than 180 degrees.

20. The anvil assembly of claim 19 wherein said predetermined range of rotation is between +/−0.5 degrees to +/−2.5 degrees.

21. The anvil assembly of claim 19 wherein said predetermined range of rotation is on the order of +/−1.0 degrees.

22. The anvil assembly of claim 16 wherein said walls extend above said first and second insert surfaces by a predetermined amount.

23. The anvil assembly of claim 22 wherein said predetermined amount said walls extend above said first and second insert surfaces is on the order of 0.5 millimeters when said inserts are parallel to said walls.

24. The anvil assembly of claim 13 wherein said first and second inserts are separated and define a channel therebetween through which a packaging tape may pass while a plastic covering film is attached thereto.

25. The anvil assembly of claim 17 wherein said at least one pin comprises one pin having two ends, each of said ends riding in one of said aligned holes.

26. The anvil assembly of claim 25 further comprising a spring surrounding said pin and sized to press said inserts against said base walls.

27. The anvil assembly of claim 25 further comprising a spacer surrounding said pin and sized to maintain said inserts adjacent said base walls and to further maintain a channel therebetween.

28. The anvil assembly of claim 18 wherein said inserts are positioned a predetermined distance from said floor such that when said inserts are rotated, said inserts abut against said floor, said floor thereby defining limits of said insert rotation.

29. An anvil assembly, useable in a package heat sealing machine, comprising:
    a U-shaped base having two opposed vertical walls extending upwardly from opposite sides of a horizontal floor, each of said walls defining a hole sized to receive a pin;
    two inserts having flat upper surfaces of predetermined widths, each insert defining a hole slightly larger than the holes defined by said walls;
    a pin having two ends, each of said ends received by one of said holes in said walls such that said pin extends from one wall to the other, over said floor, and passes through said holes defined by said inserts such that said inserts are supported by said pin between said walls.

30. The anvil assembly of claim 29 wherein each of said predetermined insert widths are substantially equal.

31. The anvil assembly of claim 29 wherein said inserts comprise bottom edges which are separated from said floor by a predetermined amount such that, when said inserts are rotated in forward and reverse directions, said bottom edges abut said floor, thereby preventing further rotation and defining a range of rotation.

32. The anvil assembly of claim 31 wherein said range of rotation is between +/−0.5 degrees to +/−2.5 degrees.

33. The anvil assembly of claim 32 wherein said range of rotation is on the order of +/−1.0 degrees.

* * * * *

UNITED STATES PATENT AND TRADEMARK OFFICE
CERTIFICATE OF CORRECTION

PATENT NO. : 6,571,850 B2
DATED : June 3, 2003
INVENTOR(S) : Scott B. Melheim

It is certified that error appears in the above-identified patent and that said Letters Patent is hereby corrected as shown below:

Column 5,
Line 17, after the word "act", insert -- against --.
Line 21, after the word "against", delete "a", and insert -- the --.

Signed and Sealed this

Twelfth Day of August, 2003

JAMES E. ROGAN
*Director of the United States Patent and Trademark Office*